US012651231B2

(12) United States Patent
Qiao

(10) Patent No.: US 12,651,231 B2
(45) Date of Patent: Jun. 9, 2026

(54) METHOD, APPARATUS AND DEVICE FOR DATA PROCESSING, AND COMPUTER READABLE STORAGE MEDIUM

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventor: Zhengzheng Qiao, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 442 days.

(21) Appl. No.: 18/043,569

(22) PCT Filed: Apr. 19, 2021

(86) PCT No.: PCT/CN2021/088020
§ 371 (c)(1),
(2) Date: Feb. 28, 2023

(87) PCT Pub. No.: WO2022/048160
PCT Pub. Date: Mar. 10, 2022

(65) Prior Publication Data
US 2023/0267410 A1 Aug. 24, 2023

(30) Foreign Application Priority Data
Sep. 1, 2020 (CN) .......................... 202010903488.4

(51) Int. Cl.
*G06Q 10/087* (2023.01)
*G06T 11/00* (2026.01)

(52) U.S. Cl.
CPC ............ *G06Q 10/087* (2013.01); *G06T 11/00* (2013.01)

(58) Field of Classification Search
CPC .. G06Q 10/087; G06Q 10/0631; G06Q 10/08; G06Q 30/0201; G06Q 30/06;
(Continued)

(56) References Cited

U.S. PATENT DOCUMENTS

2015/0088703 A1* 3/2015 Yan ....................... G06Q 10/087
705/28
2015/0199627 A1* 7/2015 Gould .................. G06Q 10/087
705/7.12
(Continued)

FOREIGN PATENT DOCUMENTS

CN 101515341 A 8/2009
CN 104616131 A 5/2015
(Continued)

OTHER PUBLICATIONS

International Search Report and Written Opinion dated Jul. 15, 2021 for International Application No. PCT/CN2021/088020.
(Continued)

*Primary Examiner* — King Y Poon
*Assistant Examiner* — Vincent Alexander Providence

(57) ABSTRACT

Embodiments of the present application provide a method, an apparatus and a device for data processing, and a computer readable storage medium. The method of the embodiments of the present application, by acquiring real-time statistical indicator data of a corresponding item according to a drawing precondition in real time before drawing, determining an item to be recommended based on the real-time statistical indicator data of the corresponding item, and automatically recommending the item to be recommended to a drawing tool, so as to make the drawing tool to
(Continued)

automatically arrange the item to be recommended on a canvas, and display the indicator data of the item to be recommended.

15 Claims, 8 Drawing Sheets

(58) Field of Classification Search
CPC .......... G06Q 30/0282; G06Q 30/0631; G06Q 30/0639; G06T 11/00; G06F 30/12
See application file for complete search history.

(56) References Cited

U.S. PATENT DOCUMENTS

| | | | |
|---|---|---|---|
| 2015/0324725 A1* | 11/2015 | Roesbery | G06Q 30/0639 705/7.39 |
| 2019/0147463 A1* | 5/2019 | Karmakar | G06N 20/00 705/7.31 |
| 2019/0236531 A1* | 8/2019 | Adato | G08B 21/182 |
| 2021/0209550 A1* | 7/2021 | Bellows | G06Q 10/0875 |

FOREIGN PATENT DOCUMENTS

| | | |
|---|---|---|
| CN | 109308630 A | 2/2019 |
| CN | 109886784 A | 6/2019 |
| CN | 110390446 A | 10/2019 |
| CN | 110705744 A | 1/2020 |
| CN | 111311293 A | 6/2020 |
| CN | 111738537 A | 10/2020 |
| DE | 102010047783 A1 | 4/2012 |
| JP | H1139364 A | 2/1999 |
| JP | 2001236428 A | 8/2001 |
| JP | 2004151955 A | 5/2004 |
| JP | 2004199237 A | 7/2004 |
| JP | 2008269418 A | 11/2008 |
| JP | 2008299768 A | 12/2008 |
| JP | 2014146190 A | 8/2014 |
| JP | 2017058762 A | 3/2017 |
| JP | 2018142293 A | 9/2018 |
| JP | 2019219860 A | 12/2019 |
| JP | 2020057164 A | 4/2020 |
| JP | 2020119381 A | 8/2020 |
| JP | 2022012059 A | 1/2022 |
| WO | WO2016199405 A1 | 12/2016 |

OTHER PUBLICATIONS

Notice of Reasons for Refusal dated Sep. 7, 2023 regarding Japanese Patent Application No. 2022-570621.
The First Office Action dated Jan. 15, 2024 for Chinese Application No. 202010903488.4.
Notice of Reasons for Refusal dated Feb. 9, 2024 for Patent Application No. 2022-570621.
The Extended European Search Report dated Jan. 8, 2024 for European Application No. 21863230.5.

* cited by examiner

METHOD, APPARATUS AND DEVICE FOR DATA PROCESSING, AND COMPUTER READABLE STORAGE MEDIUM

CROSS-REFERENCE TO RELATED APPLICATIONS

The present application is a National Stage of International Application No. PCT/CN2021/088020, filed on Apr. 19, 2021, which claims priority to Chinese Patent Application No. 202010903488.4, titled "METHOD, APPARATUS AND DEVICE FOR DATA PROCESSING, AND COMPUTER READABLE STORAGE MEDIUM", and filed into CHINA NATIONAL INTELLECTUAL PROPERTY ADMINISTRATION on Sep. 1, 2020, both of which are hereby incorporated by reference in their entireties.

TECHNICAL FIELD

The present application relates to a field of warehousing logistics, in particular to a method, an apparatus and a device for data processing, and a computer readable storage medium.

BACKGROUND

A placement position of an item on a shelf in a brick-and-mortar store has a large impact on an item sales volume and a store sales revenue. Since some store clerks place items according to their subjective consciousness and experience, the uncertainty of the impact on the item sales volume is too great. Therefore, for a store with a certain scale, there are planning requirements for the exhibition of items. Usually a professional planner draws how the items are exhibited into an item exhibition diagram, and then prints it out to an exhibition staff, and the exhibition staff will refer to the item exhibition drawing sheet to exhibit and place the items.

SUMMARY

Embodiments of the present application provides a method, an apparatus and a device for data processing, and a computer readable storage medium.

In a first aspect, an embodiment of the present application provides a method for data processing, applied to a server, including:

acquiring real-time statistical indicator data of a corresponding item of a drawing precondition in response to a data pull request of a drawing tool, where the data pull request includes the drawing precondition;

determining, according to the real-time statistical indicator data of the corresponding item, an item to be recommended; and pushing indicator data of the item to be recommended to the drawing tool.

In a second aspect, an embodiment of the present application provides a method for data processing, applied to a drawing tool for drawing an item exhibition diagram, including:

sending a data pull request to a server before drawing a target item exhibition diagram, where the data pull request includes a drawing precondition;

receiving indicator data of an item to be recommended sent by the server, where the item to be recommended is determined according to real-time statistical indicator data of an corresponding item of the drawing precondition; and automatically arranging the item to be recommended on a canvas, and displaying the indicator data of the item to be recommended.

In a third aspect, an embodiment of the present application provides an apparatus for data processing, applied to a server, including:

a module for censusing item indicator data, configured to acquire real-time statistical indicator data of a corresponding item of a drawing precondition in response to a data pull request of a drawing tool, where the data pull request includes the drawing precondition;

where the module for censusing item indicator data is further configured to determine, according to the real-time statistical indicator data of the corresponding item, an item to be recommended; and a communication module, configured to push indicator data of the item to be recommended to the drawing tool.

In a fourth aspect, an embodiment of the present application provides a drawing tool, including:

a communication module, configured to send a data pull request to a server before drawing a target item exhibition diagram, where the data pull request includes a drawing precondition;

where the communication module is further configured to receive indicator data of an item to be recommended sent by the server, where the item to be recommended is determined according to real-time statistical indicator data of a corresponding item of the drawing precondition; and a drawing module, configured to automatically arrange the item to be recommended on a canvas, and display the indicator data of the item to be recommended.

In a fifth aspect, an embodiment of the present application provides a device for data processing, including:

a processor, a memory, and a computer program stored in the memory and executable on the processor;

where when the processor executes the computer program, the above-mentioned method described as the first aspect is implemented.

In a sixth aspect, an embodiment of the present application provides a drawing tool, including:

a processor, a memory, and a computer program stored in the memory and executable on the processor;

where when the processor executes the computer program, the above-mentioned method described as the second aspect is implemented.

In a seventh aspect, an embodiment of the present application provides a computer readable storage medium, where the computer readable medium has a computer program stored therein, when the computer program is executed by a processor, the above-mentioned method described as the first aspect or the second aspect is implemented.

In an eighth aspect, an embodiment of the present application provides a computer program, including a program code, when the program code is executed by a computer, the program code executes the above-mentioned method described as the first aspect or the second aspect.

The method, the apparatus and the device for data processing, and the computer readable storage medium provided by the embodiments of the present application, by acquiring, real-time statistical indicator data of a corresponding item according to a drawing precondition in real time before drawing, determining an item to be recommended based on the real-time statistical indicator data of the corresponding item, and automatically recommending the item to be recommended to a drawing tool, so as to make the drawing tool to automatically arrange the item to be recommended on a canvas, and display the indicator data of the item to be recommended.

Through above-mentioned accompanying drawings, explicit embodiments of the present application have been shown, and will be described in more detail hereinafter. These accompanying drawings and written descriptions are not intended to limit the scope of the concepts of the present application in any way, but to illustrate the concepts of the present application to those skilled in the art by referring to specific embodiments.

DESCRIPTION OF EMBODIMENTS

Illustrative embodiments will be described in detail herein, examples of which are illustrated in the accompanying drawings. When the following description refers to the accompanying drawings, the same numerals in different accompanying drawings refer to the same or similar elements unless otherwise indicated. The implementations described in the illustrative embodiments below are not intended to represent all embodiments consistent with the present application. Rather, they are merely examples of apparatus and methods consistent with some aspects of the present application as recited in the appended claims.

First, terms involved in the embodiments of the present application are explained as the following.

Shelf: an important apparatus for placing an item in order to improve a warehousing efficiency or facilitate a user to purchase.

Exhibition: referring to showing an item regularly and intentionally to a user.

Plateau efficiency: referring to a turnover that can be produced per plateau area, and referring to a turnover produced by a unit area of a shelf in the present application.

Site patrol: a general term for assigning a designated employee to patrol and inspect the execution of placement, and exhibition of items in a store or a supermarket.

Health level of a shelf: it can reflect an amount of earnings brought by a shelf to a certain extent, if an item placed on the shelf does not produce efficiency for a long time, it is regarded as unhealthy.

In addition, the terms "first", "second", etc. are used for descriptive purposes only, and should not be construed as indicating or implying relative importance or implicitly indicating a number of indicated technical features. In the description of the following respective embodiments, the meaning of "multiple" is two or more, unless otherwise expressly and specifically defined.

Figure 1:
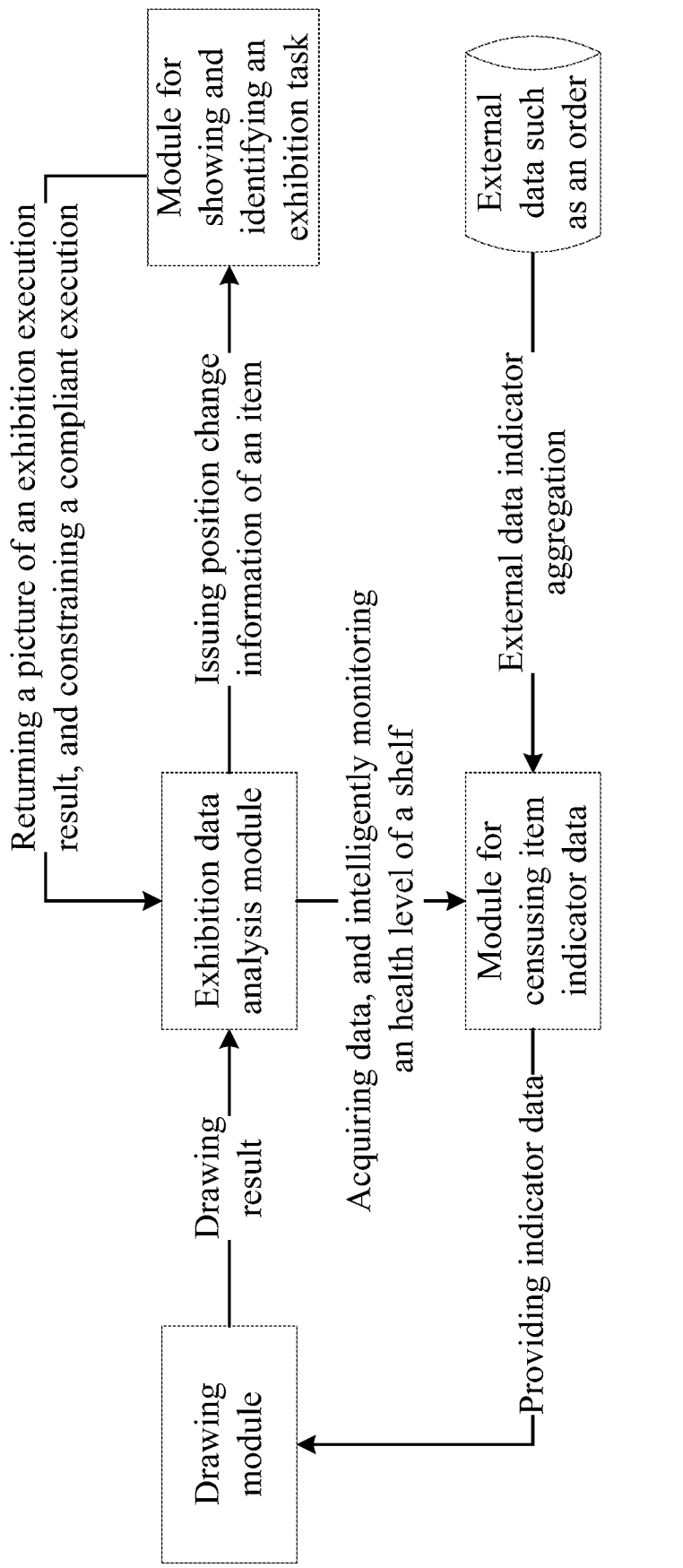
FIG. 1 is an architectural diagram of an item exhibition system according to one or more embodiments of the present application.

The embodiments of the present application can specifically applied in an item exhibition system, as shown in FIG. 1, the item exhibition system may include a drawing tool, a server configured to perform a real-time census of an item indicator data and recommend a group of items to the drawing tool, and an item exhibition terminal device used by an exhibition staff. Before performing the exhibition planning, and drawing an item exhibition diagram, the drawing tool can carry a drawing precondition in a data pull request and send the data pull request to the server, the server acquires real-time statistical indicator data of a corresponding item according to the drawing precondition, and recommends at least one group of items to be recommended to the drawing tool; and the drawing tool automatically arranges the item to be recommended on a canvas, and displays the indicator data of the item to be recommended, for a planner to use it as a reference when drawing, and the planner can independently choose whether to directly use the item to be recommended or make adjustments.

As shown in FIG. 1, the server may include an exhibition data analysis module and a module for censusing item indicator data: the drawing tool may include a drawing module; the item exhibition terminal device may include a module for showing and identifying an exhibition task. The drawing module selects a corresponding store or an area for drawing according to an item indicator data, and sends, after completing the drawing, a drawing result to the exhibition data analysis module. The exhibition data analysis module receives the drawing result of the drawing module, analyses position change of each item, generates before and after comparison data, generates, according to the comparison data, a position change detail or a picture of an item and issue it to the module for showing and identifying the exhibition task, to provide the exhibition staff with the basis for execution. The module for showing and identifying the exhibition task displays the received position change detail or picture of the item, so as to make the exhibition staff to execute the task based on this, after completing the execution, takes a picture of an exhibition execution result and returns it to the exhibition data analysis module to feedback the execution status. The exhibition data analysis module receives the picture of the exhibition execution result, and finally identifies a result of an exhibition execution, thereby realizing supervision of the exhibition execution and intelligent site patrol for a store. In addition, the exhibition data analysis module can further read indicator data from the module for censusing item indicator data periodically according to a current exhibiting goods, monitor the health level of the shelf, notify the planner in time, and thereby realizing intelligent exhibition of shelf goods. The module for censusing item indicator data censuses data of a respective store, data of a respective item, generates statistical data according to configuration indicators such as a sales volume, a sales revenue, a gross profit, and a net profit, for being used by the exhibition data analysis module and the drawing module.

The drawing result of the drawing module can be acquired, and the analysis of the exhibition position change of the item is performed, and interaction is performed.

The method for data processing provided by the embodiments of the present application can acquire the real-time statistical indicator data of the corresponding item according to the drawing precondition in real time, determine the item to be recommended based on the real-time statistical indicator data of the corresponding item, and recommend automatically the item to be recommended to the drawing tool, which can reflect actual sales situation of an item in the market to the drawing tool and provide a data basis for a planner, playing a key guiding role for the planner in a planning of an item exhibition, so that the item exhibition is more intelligent, and a plateau efficiency and an health level of a shelf can be improved.

The technical solution of the present application and how the technical solution of the present application solves the above-mentioned technical problems will be described in detail below with specific embodiments. The following specific embodiments may be combined with each other, and the same or similar concepts or processes may not be repeated in some embodiments. The embodiments of the present application will be described below with reference to the accompanying drawings.

Figure 2:
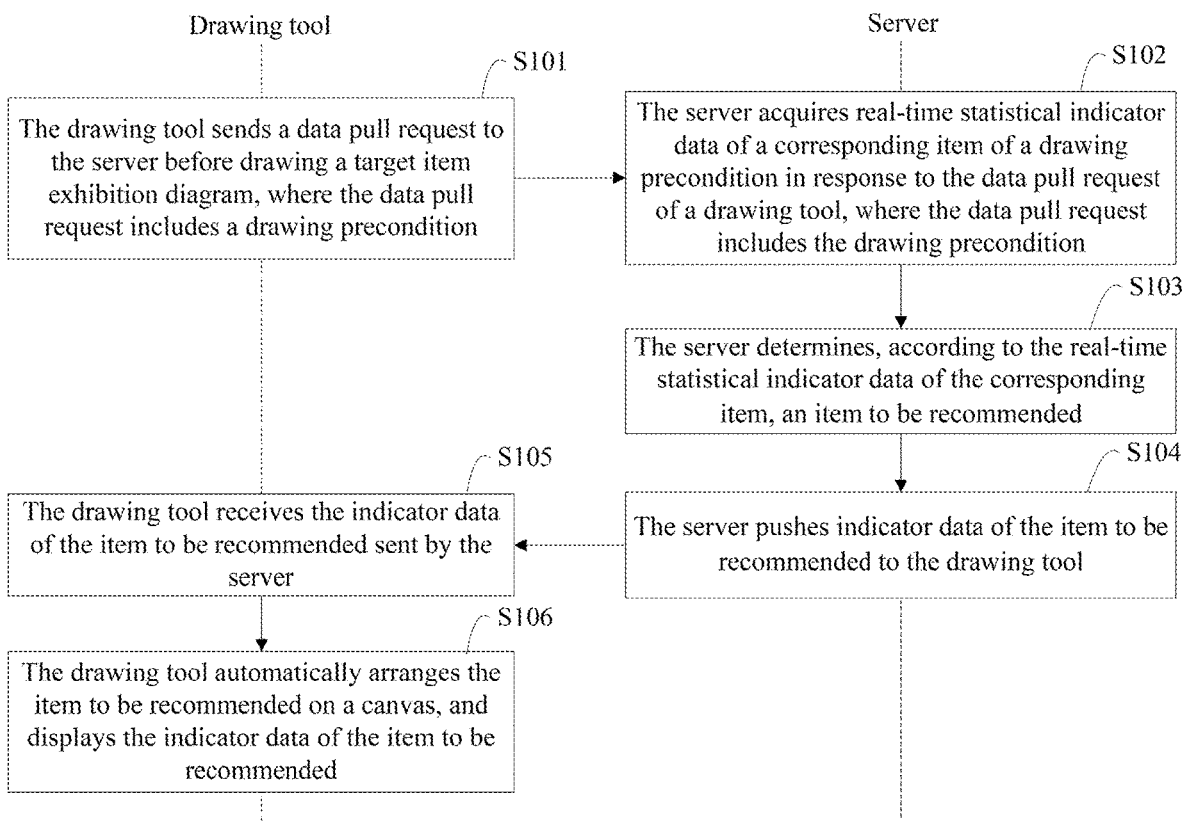
FIG. 2 is a flowchart of a method for data processing according to one or more embodiments of the present application.

FIG. 2 is a flowchart of a method for data processing according to one or more embodiments of the present application. As shown in FIG. 2, specific steps of the method are as follows.

Step S101, the drawing tool sends a data pull request to the server before drawing a target item exhibition diagram, where the data pull request includes a drawing precondition.

The drawing precondition includes at least one of the following: information of an applicable object of the item exhibition diagram to be drawn, the included category of items, and the items. For example, the information of the applicable object may be a scope of an applicable geographical area, such as a planning item exhibition diagram in Haidian District, Beijing, etc.: exhibition positions contained on an applicable shelf (e.g. the shelf includes an upper, a middle and a lower floors, etc.); a scale of the applicable object, such as planning an item exhibition diagram for a small-scale supermarket or a convenience store, or planning an item exhibition diagram for a large-scale chain store or a supermarket chain, etc.

The drawing tool may be any kind of tools that can be used for item exhibition drawing, such as a computer aided design (CAD for short) tool and its commercial version, etc., which will not be specifically limited here in this embodiment.

In this embodiment, before drawing the target item exhibition diagram, the drawing tool sends the data pull request including the drawing precondition to the server, to acquire an item to be recommended and its real-time statistical indicator data from the server.

Step S102, the server acquires real-time statistical indicator data of a corresponding item of a drawing precondition in response to the data pull request of a drawing tool, where the data pull request includes the drawing precondition.

In response to the data pull request of the drawing tool, the server acquires, according to the drawing precondition in the data pull request, real-time statistical indicator data of the corresponding item.

The real-time statistical indicator data of the item is obtained by the real-time census according to actual sales data of an item in the market. The real-time statistical indicator data of the item may include statistical data in one or more dimensions, where statistical data in each dimension may include data of one or more indicator items.

Illustratively, the dimension of the statistical data may include at least one of the following: season, region (such as provinces, or the north and the south, etc.), business format (such as a large supermarket, a convenience store, a large outlet, a community store, a fruit store, a 24H store, etc.), a sales revenue, popularity, a profit revenue, ad visibility/exposure, an area with smaller granularity (such as analyzing which brand of products people near a certain road or district like), item circulation, goods relevance (for example, when people buy milk powder, they usually think of buying diapers, etc.), and a stock keeping unit (SKU for short).

Illustratively, the indicator item may include at least one of the following: a sales volume, a sales revenue, a gross profit, a net profit, turnover time, and last sale time.

In this step, according to the precondition, the real-time statistical indicator data of an item involved in this planning defined by the current precondition can be determined.

For example, an applicable object of this planning is Haidian District, Beijing, the precondition further includes a designated item to be exhibited: then, in this step, the real-time statistical indicator data of the designated item to be exhibited in Haidian District, Beijing can be acquired.

Step S103, the server determines, according to the real-time statistical indicator data of the corresponding item, an item to be recommended.

After acquiring the real-time statistical indicator data of the corresponding item, the server can determine the item to be recommended according to a preset recommended algorithm.

The recommended algorithm can be configured and adjusted according to an actual application scenario, which will not be specifically limited here in this embodiment.

Step S104, the server pushes indicator data of the item to be recommended to the drawing tool.

After determining the item to be recommended according to the real-time statistical indicator data of the corresponding item, the server pushes the indicator data of the item to be recommended to the drawing tool, to recommend the item to be recommended to the planner through the drawing tool, so as to make the planner to refer to the item to be recommended for the planning and drawing of the item exhibition.

Step S105, the drawing tool receives the indicator data of the item to be recommended sent by the server.

The item to be recommended is determined by the server according to the real-time statistical indicator data of the corresponding item of the drawing precondition.

Step S106, the drawing tool automatically arranges the item to be recommended on a canvas, and displays the indicator data of the item to be recommended.

After receiving the item to be recommended from the server, the drawing tool automatically arranges the item to be recommended on a canvas, and displays the indicator data of the item to be recommended, which can assist the layout of the shelf or automatically generate a drawing template to play a guiding role for the planner in a planning and drawing.

The embodiment of the present application, by acquiring real-time statistical indicator data of a corresponding item according to a drawing precondition in real time before drawing, determining an item to be recommended based on the real-time statistical indicator data of the corresponding item, and automatically recommending the item to be recommended to a drawing tool, so as to make the drawing tool to automatically arrange the item to be recommended on a canvas, and display the indicator data of the item to be recommended, which can reflect actual sales situation of an item in the market to the drawing tool, provide a data basis for a planner, and play a key guiding role for the planner performing a planning for an exhibition of an item, so that the item exhibition is more intelligent, and a plateau efficiency and an health level of a shelf can be improved.

Figure 3:
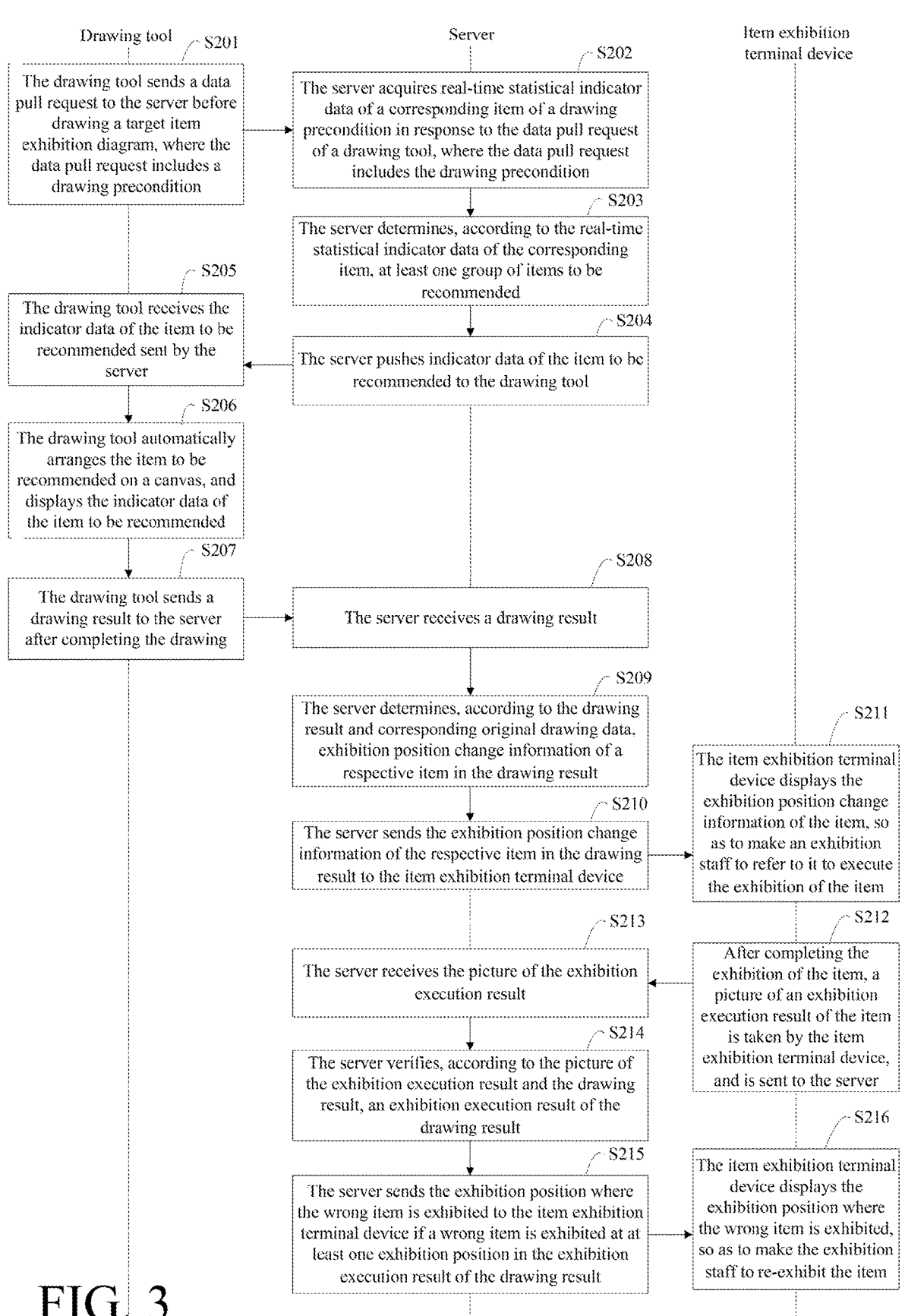
FIG. 3 is a flowchart of a method for data processing according to one or more embodiments of the present application.

FIG. 3 is a flowchart of a method for data processing according to one or more embodiments of the present application. On the basis of the above-mentioned embodiment, in this embodiment, the server may also receive the drawing result: determine exhibition position change information of a respective item in the drawing result according to the drawing result and corresponding original drawing data; and send the exhibition position change information of the respective item to the item exhibition terminal device; and furthermore, the server may also receive the picture of the exhibition execution result sent by the item exhibition terminal device; and verify an exhibition execution result of the drawing result according to the picture of the exhibition execution result and the drawing result. As shown in FIG. 3, specific steps of the method are as follows.

Step S201, the drawing tool sends a data pull request to the server before drawing a target item exhibition diagram, where the data pull request includes a drawing precondition.

The drawing precondition includes at least one of the following: information of an applicable object of the item exhibition diagram to be drawn, the included category of items, and the items. For example, the information of the applicable object may be a scope of an applicable geographical area, such as a planning item exhibition diagram in Haidian District, Beijing, etc.: exhibition positions contained on an applicable shelf (e.g. the shelf includes an upper, a middle and a lower floors, etc.); a scale of the applicable object, such as planning an item exhibition diagram for a small-scale supermarket or a convenience store, or planning an item exhibition diagram for a large-scale chain store or a supermarket chain, etc.

For example, when drawing, choose to use store or area, etc.

The drawing tool may be any kind of tools that can be used for item exhibition drawing, such as a computer aided design (CAD for short) tool and its commercial version, etc., which will not be specifically limited here in this embodiment.

In this embodiment, before drawing the target item exhibition diagram, the drawing tool sends the data pull request including the drawing precondition to the server, to acquire an item to be recommended and its real-time statistical indicator data from the server.

Step S202, the server acquires real-time statistical indicator data of a corresponding item of a drawing precondition in response to the data pull request of a drawing tool, where the data pull request includes the drawing precondition.

In this embodiment, before acquiring the real-time statistical indicator data of the corresponding item of the drawing precondition, the server may also acquire online sales data and/or offline sales data of all items periodically, so that the sales data of an item can be acquired in real time, and the indicator data can be further censused and obtained in real time.

The sales data acquired in real time may include offline sales data of a respective store, as well as data that can be acquired from other channels, such as online sales data, or data from one or more other data platforms, the source of the sales data will not be specifically limited in this embodiment.

For example, by acquiring order data of the respective store, corresponding sales data can be obtained.

In this step, in response to the data pull request of a drawing tool, the server acquires, according to the drawing precondition in the data pull request, real-time statistical indicator data of the corresponding item.

The real-time statistical indicator data of the item is obtained by the real-time census according to actual sales data of an item in the market. The real-time statistical indicator data of the item may include statistical data in one or more dimensions, where statistical data in each dimension may include data of one or more indicator items.

Furthermore, acquiring the real-time statistical indicator data of the corresponding item of the drawing precondition can be implemented by using the following manner:

censusing, according to current sales data of the corresponding item, indicator data of the corresponding item in multiple dimensions to obtain the real-time statistical indicator data of the corresponding item.

Illustratively, the dimension of the statistical data may include at least one of the following: season, region (such as provinces, or the north and the south, etc.), business format (such as a large supermarket, a convenience store, a large outlet, a community store, a fruit store, a 24H store, etc.), a sales revenue, popularity, a profit revenue, ad visibility/exposure, an area with smaller granularity (such as analyzing which brand of products people near a certain road or district like), item circulation, goods relevance (for example, when people buy milk powder, they usually think of buying diapers, etc.), and a stock keeping unit (SKU for short).

Illustratively, the indicator item may include at least one of the following: a sales volume, a sales revenue, a gross profit, a net profit, turnover time, and last sale time.

In a possible implementation, the indicator data of the all items can be censused in multiple dimensions according to the current sales data of the all items, and indicator statistical data pool can be formed. Subsequently, when the real-time statistical indicator data of some items needs to be acquired, it can be selected from the indicator statistical data pool to improve the efficiency.

In this step, according to the precondition, the real-time statistical indicator data of an item involved in this planning defined by the current precondition can be determined.

For example, an applicable object of this planning is Haidian District, Beijing, the precondition further includes a designated item to be exhibited: then, in this step, the real-time statistical indicator data of the designated item to be exhibited in Haidian District, Beijing can be acquired.

Step S203, the server determines, according to the real-time statistical indicator data of the corresponding item, at least one group of items to be recommended.

After acquiring the real-time statistical indicator data of the corresponding item, the server can determine the item to be recommended according to a preset recommended algorithm.

In a possible implementation, the data pull request further includes a selected recommended algorithm identifier, determining the item to be recommended according to the real-time statistical indicator data of the corresponding item can be implemented specifically by using the following manner:

determining, according to the real-time statistical indicator data of the corresponding item and a recommended algorithm corresponding to the recommended algorithm identifier, at least one group of the items to be recommended.

The recommendation weight of an indicator of a respective dimension is set in the recommendation algorithm, and at least one dimension of indicator has a different recommendation weight among different recommendation algorithms.

Illustratively, multiple recommended algorithms can be set, by setting a different recommendation weight of the indicator of the respective dimension for each recommended algorithm, each recommended algorithm highlights a certain feature. For example, algorithm 1 has a heavy weight and a large proportion, algorithm 2 has a large profit weight, algorithm 3 has a high exposure, commonly known as Internet celebrity product, algorithm 4 has a large regional weight. According to the recommended algorithm, goods under a certain category are combined, and the combination of items having relatively good indicator data after synthesizing the weights of respective dimensions is taken out.

The recommended algorithm can be configured and adjusted according to an actual application scenario, which will not be specifically limited here in this embodiment.

In a possible implementation, the server can push relevant data of respective recommended algorithms to the drawing tool, the drawing tool shows them for the planner to choose. The recommended algorithm in the data pull request may be a recommended algorithm designated by the planner through the drawing tool.

In a possible implementation, one or more recommended algorithms can be included in the data pull request, if multiple recommended algorithms are included, the server determines a group of corresponding items to be recommended respectively according to each recommended algorithm, thereby multiple groups of items to be recommended can be obtained.

In this embodiment, the server can acquire online sales data and/or offline sales data of all items periodically through the module for censusing item indicator data, acquire the indicator data by censusing in real time, and determine the item to be recommended corresponding to the drawing precondition.

Step S204, the server pushes indicator data of the item to be recommended to the drawing tool.

After determining the item to be recommended according to the real-time statistical indicator data of the corresponding item, the server pushes the indicator data of the item to be recommended to the drawing tool, to recommend the item to be recommended to the planner through the drawing tool, so as to make the planner to refer to the item to be recommended for the planning and drawing of the item exhibition.

Step S205, the drawing tool receives the indicator data of the item to be recommended sent by the server.

The item to be recommended is determined by the server according to the real-time statistical indicator data of the corresponding item of the drawing precondition.

Step S206, the drawing tool automatically arranges the item to be recommended on a canvas, and displays the indicator data of the item to be recommended.

In this embodiment, after receiving the item to be recommended from the server, the drawing tool automatically arranges the item to be recommended on the canvas, and displays the indicator data of the item to be recommended, which can assist the layout of the shelf or automatically generate a drawing template and play a guiding role for the planner in a planning and drawing, which can increase the sales volume and the profit of an item to a greater extent, feedback timely the market situation to the shelf exhibition at the same time, and improve the overall plateau efficiency of the shelf.

In this embodiment, after completing the drawing and obtaining the drawing result, sending the drawing result to the server are the same as steps S207-S210, the exhibition data analysis module of the server analyses position change of each item, generates comparison data before and after the position change, generates, according to the comparison data, a position change detail or a picture of an item and issues it to the item exhibition terminal device, to provide the exhibition staff with the basis for execution.

The item exhibition terminal device is a device used by the exhibition staff to show and confirm the exhibition task, and may be a mobile phone or a personal digital assistant (PDA for short), etc., which will not be specifically limited here in this embodiment.

Step S207, the drawing tool sends a drawing result to the server after completing the drawing.

After the planner completes the drawing through the drawing tool, the drawing result is obtained, and the drawing tool sends the drawing result to the server.

The drawing result includes the data of the item exhibition diagram whose planning has been completed, specifically includes the exhibition position of each item.

Step S208, the server receives a drawing result.

Step S209, the server determines, according to the drawing result and corresponding original drawing data, exhibition position change information of a respective item in the drawing result.

In this embodiment, each drawing result corresponds to information of one drawing precondition and version information. In this step, the current drawing result and the corresponding original drawing data can be a drawing result of a last version corresponding to the current drawing result.

Usually, the original drawing data has the same drawing precondition as the drawing result. Under some application scenarios, the original drawing data may not have exactly the same drawing precondition as the drawing result.

For example, information of the drawing precondition and version information corresponding to the drawing result may include: a goods category, an overall region (e.g. a city name), a shelf number and a version number.

For example, information of the drawing precondition and version information corresponding to the drawing result may include: a store identifier and a version number.

In this embodiment, no matter which version of the drawing result is, the exhibition position of each item in the item exhibition diagram is included.

In an actual application, when a drawing result is obtained, the drawing result will be executed by the exhibition staff, the exhibition manner of an item on a shelf is exhibited according to latest drawing result. Therefore, in this step, the original drawing data corresponding to the current drawing result has been executed by the exhibition staff in time, a current exhibition position of the item is exhibited according to an exhibition position of the item in the original drawing data.

In this step, the server analyzes an expected exhibition position of each item according to the current drawing result, and analyzes the current exhibition position of each item according to the original drawing data corresponding to the current drawing result: by comparing the expected exhibition position and the current exhibition position of the same item, it can be determined whether the position of the item has changed, and the exhibition position change information of the item whose position has changed can be determined, and the exhibition position change information of the respective item can be obtained, that is, the item position change detail can be obtained.

The exhibition position change information of the item may include the exhibition position of the item before the change and the exhibition position after the change. For example, goods A originally recorded a number 1 of a layer, now it becomes 2.

In a possible implementation, the exhibition position change information of the item can be text or picture information, which will not be specifically limited here in this embodiment.

Step S210, the server sends the exhibition position change information of the respective item in the drawing result to the item exhibition terminal device.

In the related art, the planner draws how the items are exhibited into an item exhibition diagram, and then prints it out to an exhibition staff, and the exhibition staff will refer to the item exhibition drawing sheet to exhibit and place the items. There is a communication gap between the planner and the exhibition staff, and the exhibition staff cannot timely feed back and adjust the planning of the items according to market conditions.

In this embodiment, after obtaining the exhibition position change information of the respective item in the drawing result, the server sends the exhibition position change information of the respective item to the item exhibition terminal device, so that the exhibition staff can view the exhibition position change information of the respective item through the item exhibition terminal device, and readjust the position of the item on the shelf according to the exhibition position change information of the item, thereby realizing that the planning and exhibition are no longer communicated by a paper document, and realize the automatic and convenient data flow between the planner and the exhibition staff, the data is continuously layered.

The server sends the exhibition position change information of the respective item in the drawing result to the item exhibition terminal device, that is, distributes the exhibition task to the corresponding exhibition staff, and requires the exhibition staff to complete the adjustment of the corresponding item according to the exhibition position change information of the respective item.

Step S211, the item exhibition terminal device displays the exhibition position change information of the item, so as to make an exhibition staff to refer to it to execute the exhibition of the item.

After receiving the exhibition position change information of the item, the item exhibition terminal device displays the exhibition position change information of the item. By viewing the exhibition position change information of the item, the exhibition staff moves the item whose position has changed from a current exhibition position to an expected exhibition position, which greatly improves a placement efficiency of the exhibition staff.

Step S212, after completing the exhibition of the item, a picture of the exhibition execution result of the item is taken by the item exhibition terminal device, and is sent to the server.

After the item exhibition is completed, the exhibition staff is required to use the item exhibition terminal device to take the picture of the exhibition execution result of the item, and send it to the server.

The picture of the exhibition execution result of the item may include one or more pictures, the picture of the exhibition execution result of all items should cover all changed positions of all the exhibition item.

For example, an item on a shelf A needs to be adjusted, the picture of the exhibition execution result includes the shelf after adjusting.

Step S213, the server receives the picture of the exhibition execution result.

Step S214, the server verifies, according to the picture of the exhibition execution result and the drawing result, an exhibition execution result of the drawing result.

In this embodiment, verifying the exhibition execution result of the drawing result according to the picture of the exhibition execution result and the drawing result can be implemented specifically by using the following manner.

Identifying, according to the picture of the exhibition execution result, an item actually placed at each exhibition position: comparing the item actually placed at each exhibition position with an item at a corresponding exhibition position in the drawing result to determine whether a correct item is exhibited at each exhibition position.

In a possible implementation, the identifying, according to the picture of the exhibition execution result, the item actually placed at each exhibition position can be completed by the server itself, or it can be completed by a special image identification center; by performing image analysis on the picture of the exhibition execution result, an item actually placed at each exhibition position is identified.

If it is determined there is at least one exhibition position where a wrong item is exhibited in the exhibition execution result after the verifying, the step S215 will be executed, an exhibition position where the wrong item is exhibited is sent to the item exhibition terminal device.

In another implementation of this embodiment, the verifying the exhibition execution result of the drawing result according to the picture of the exhibition execution result and the drawing result can be implemented specifically by using the following manner:

identifying an actual exhibition position of each item according to the picture of the exhibition execution result: comparing the actual exhibition position of each item with an expected exhibition position of the same item in the drawing result to determine whether each item exhibits at a correct position.

In a possible implementation, if it is determined there is at least one item exhibits at a wrong position in the exhibition execution result after the verifying, the server can send the item exhibiting at the wrong position to the item exhibition terminal device. The item exhibition terminal device displays the item exhibiting at the wrong position, so as to make the exhibition staff to re-exhibit the item.

In a possible implementation, if a changed position of a certain exhibition item is not included in the picture of the exhibition execution result of the item, the changed position of the exhibition item that is not included in the picture of the exhibition execution result of the item can be sent to the item exhibition terminal device.

In this embodiment, after verifying, if it is determined that the picture of the exhibition execution result and the drawing result are inconsistent, a verification result is returned to the item exhibition terminal device, so as to make the corresponding exhibition staff to check the exhibition task. If it is determined that the picture of the exhibition execution result and the drawing result are consistent, the exhibition task is completed.

Step S215, the server sends the exhibition position where the wrong item is exhibited to the item exhibition terminal device if a wrong item is exhibited at at least one exhibition position in the exhibition execution result of the drawing result.

Step S216, the item exhibition terminal device displays the exhibition position where the wrong item is exhibited, so as to make the exhibition staff to re-exhibit the item.

In the related art, for an exhibition execution status of the drawing result by the exhibition staff, it needs to rely a store inspection staff to inspect problems, the labor cost is high, and the exhibition execution result cannot be effectively supervised.

In this embodiment, if it is determined there is at least one exhibition position where a wrong item is exhibited in the exhibition execution result after the verifying, the server makes the item exhibition terminal device to display the exhibition position where the wrong item is exhibited by sending an exhibition position where the wrong item is exhibited to the item exhibition terminal device, so that the exhibition staff can easily find the exhibition position where the wrong item is exhibited, and replace the item at this exhibition position, so as to realize the correction of the item exhibition and improve the efficiency of the item exhibition.

The server of the embodiment of the present application can receive the picture of the exhibition execution result: automatically verify the exhibition execution result of the drawing result according to the picture of the exhibition execution result and the drawing result, thereby realizing automatic supervision on the exhibition execution result and intelligent site patrol, automatically constraining the execution of the exhibition staff, and reducing workload of an on-site patrol staff and labor cost of on-site patrol: furthermore, when it is determined a wrong item is exhibited at at least one exhibition position after verifying, an exhibition position where the wrong item is exhibited is sent to the item exhibition terminal device, so as to make the item exhibition terminal device to display the exhibition position where the wrong item is exhibited, so that the exhibition staff can easily find the exhibition position where the wrong item is exhibited, and replace the item at this exhibition position, thereby realizing the correction of the item exhibition and improving the efficiency of the item exhibition.

Figure 4:
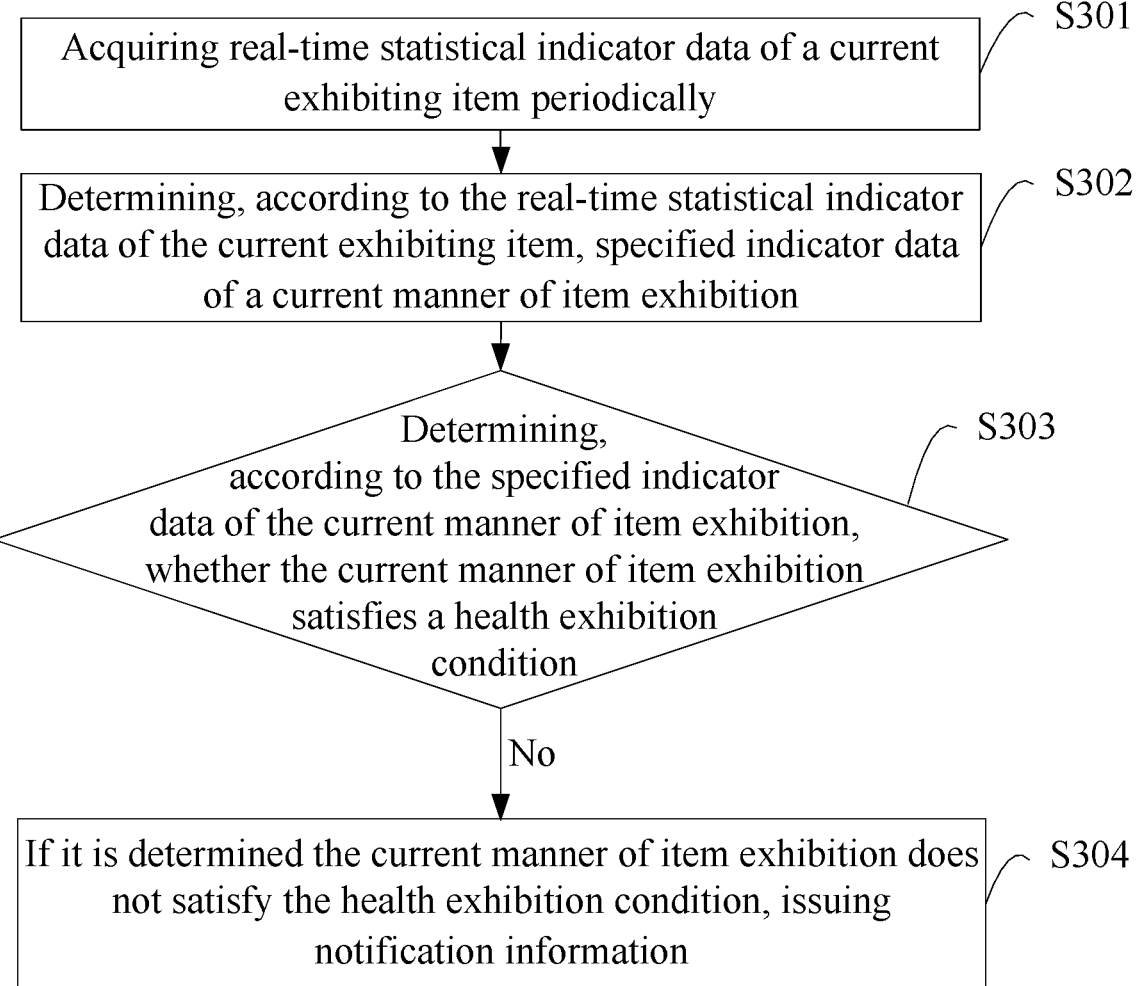
FIG. 4 is a flowchart of a method for data processing according to one or more embodiments of the present application.

FIG. 4 is a flowchart of a method for data processing according to one or more embodiments of the present application. On the basis of the above-mentioned embodiments, in this embodiment, the server can further acquire real-time statistical indicator data of a current exhibiting item periodically: determine specified indicator data of a current manner of item exhibition according to the real-time statistical indicator data of the current exhibiting item, which can realize the periodical detection of the health level of the shelf. As shown in FIG. 4, specific steps of the method are as follows.

Step S301, acquiring real-time statistical indicator data of a current exhibiting item periodically.

In this embodiment, the server can acquire the real-time statistical indicator data of the current exhibiting item periodically according to a certain frequency.

The real-time statistical indicator data of the item is obtained according to the real-time census according to actual sales data of an item in the market. The real-time statistical indicator data of the item may include statistical data in one or more dimensions, and statistical data in each dimension may include data of one or more indicator items.

Illustratively, the dimension of the statistical data may include at least one of the following: season, region (such as provinces, or the north and the south, etc.), business format (such as a large supermarket, a convenience store, a large outlet, a community store, a fruit store, a 24H store, etc.), a sales revenue, popularity, a profit revenue, ad visibility/ exposure, an area with smaller granularity (such as analyzing which brand of products people near a certain road or district like), item circulation, goods relevance (for example, when people buy milk powder, they usually think of buying diapers, etc.), and a stock keeping unit (SKU for short).

Illustratively, the indicator item may include at least one of the following: a sales volume, a sales revenue, a gross profit, a net profit, turnover time, and last sale time.

Step S302, determining, according to the real-time statistical indicator data of the current exhibiting item, specified indicator data of a current manner of item exhibition.

The specified indicator data is used to measure the health level of the current manner of item exhibition.

Illustratively, the specified indicator data may include at least one of the following: a sales volume, a sales revenue, a gross profit, a net profit, turnover time, and last sale time.

In a possible implementation, the specified indicator data of the current manner of item exhibition may include specified indicator data of each item, and/or the overall specified indicator data.

Step S303, determining, according to the specified indicator data of the current manner of item exhibition, whether the current manner of item exhibition satisfies a health exhibition condition.

The health exhibition condition may be pre-configured health threshold ranges for various specified indicator data.

In this step, if every kind of the specified indicator data of the current manner of item exhibition is within a corresponding health threshold range, it is determined the health exhibition condition is satisfied.

If at least one kind of the specified indicator data of the current manner of item exhibition is not within a corresponding health threshold range, it is determined the health exhibition condition is not satisfied.

Step S304, if it is determined the current manner of item exhibition does not satisfy the health exhibition condition, issuing notification information.

The notification information may include the item and the specified indicator data that does not satisfy the health exhibition condition.

In a possible implementation, the server can send the notification information to the planner, so as to make the planner to adjust the position of the item or take the item off the shelf.

In a possible implementation, the server can send the notification information to a designee, so as to make the designee to take a measure such as promotion, off the shelf and position adjustment for the item, which can increase the sales volume of the item.

For example, the duration since the last sale time of a certain item exceeds the corresponding health threshold range, it means that the item is an unpopular goods that has received less attention, and a relevant staff can be notified to take it off the shelf.

For example, if the recent sales volume of a certain item are not within the corresponding health threshold range, it means that the item is an unsalable goods, and a relevant staff can be notified to promote the item.

In addition, the specific implementation of issuing the notification information can be configured and adjusted according to an actual application scenario, for example, by sending a message to a designated terminal, or sending a short message, email, instant communication information to a designated contact information, etc., which will not be specifically limited here in this embodiment.

For example, according to the store sales receipt, censusing data in the SKU dimension, aggregating the SKUs of the items on the current shelf, obtaining the total sales revenue, a gross profit, a plateau efficiency and other indicator data of the current shelf, checking the health level of the current shelf, and when the health level of the current shelf does not meet the condition, it will give a timely warning by issuing a prompt information.

Figure 5:
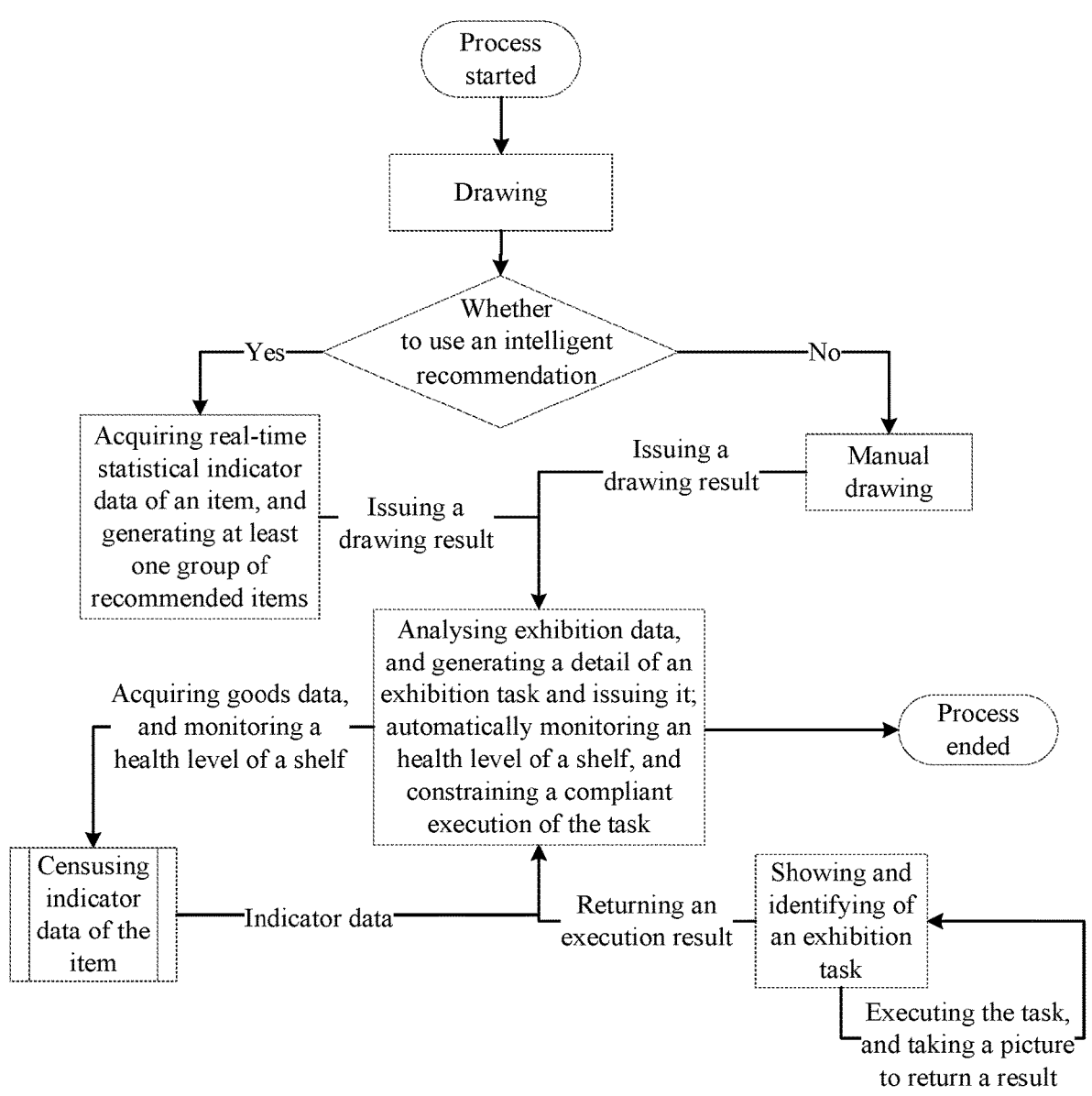
FIG. 5 is a schematic diagram of an overall flow of the item exhibition system according to one or more embodiments of the present application.

FIG. 5 is a schematic diagram of an overall flow of the item exhibition system according to one or more embodiments of the present application, in a possible implementation of this embodiment, combining the above-mentioned embodiments, the overall flow of the item exhibition system as shown in FIG. 5 is as follows: when drawing, manual drawing can be directly performed by a planner, or the method for data processing provided in the embodiment of the present application can be used to realize to: intelligently recommend an item to a drawing tool, and guide the planner to complete the drawing according to the items to be recommended and indicator data, to obtain a drawing result: perform data analysis according to the drawing result, to obtain a position change detail of the item, and generate a detail of an exhibition task and issue it: automatically verify an execution result according to a returned picture of the exhibition execution result, which can constrain a compliant execution of the task; automatically detect an health level of a shelf according to real-time statistical indicator data of the item.

The embodiment of the present application, by acquiring real-time statistical indicator data of a current exhibiting item periodically, performs health detection on the current manner of item exhibition according to the real-time statistical indicator data of the current exhibiting item, and if it is determined the current manner of item exhibition does not satisfy the health exhibition condition, issues the notification information, so as to make the planner to adjust the position of the item or take the item off the shelf, and realize intelligent adjustment to an item exhibition of a shelf.

Figure 6:
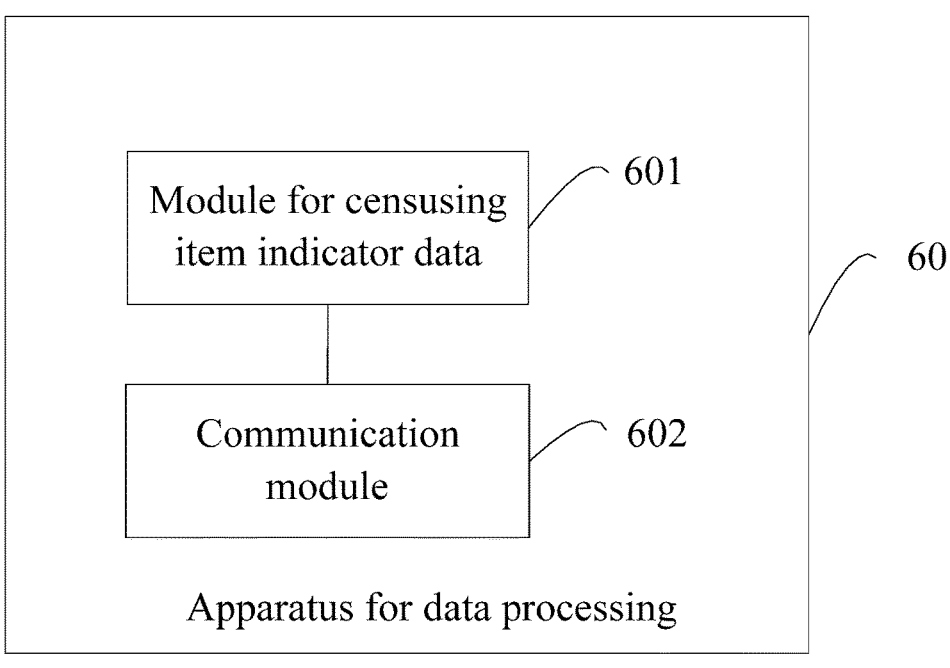
FIG. 6 is a schematic structural diagram of an apparatus for data processing according to one or more embodiments of the present application.

FIG. 6 is a schematic structural diagram of an apparatus for data processing according to one or more embodiments of the present application. The apparatus for data processing provided by the embodiment of the present application can execute the processing flow provided by the embodiments of the method for data processing. As shown in FIG. 6, the apparatus for data processing 60 includes: a module for censusing item indicator data 601 and a communication module 602.

Specifically, the module for censusing item indicator data 601 is configured to acquire real-time statistical indicator data of a corresponding item of a drawing precondition in response to a data pull request of a drawing tool, where the data pull request includes the drawing precondition.

The module for censusing item indicator data 601 is further configured to determine, according to the real-time statistical indicator data of the corresponding item, an item to be recommended.

The communication module 602 is configured to push indicator data of the item to be recommended to the drawing tool.

The apparatus provided by the embodiment of the present application can be specifically configured to execute the method flow executed by the server in above-mentioned embodiments, and the specific functions will not be repeated here.

The embodiment of the present application, by acquiring real-time statistical indicator data of a corresponding item according to a drawing precondition in real time before drawing, determining an item to be recommended based on the real-time statistical indicator data of the corresponding item, and automatically recommending the item to be recommended to a drawing tool, so as to make the drawing tool to automatically arrange the item to be recommended on a canvas, and display the indicator data of the item to be recommended, which can reflect actual sales situation of an item in the market to the drawing tool, provide a data basis for a planner, and play a key guiding role for the planner performing a planning for an exhibition of an item, so that the item exhibition is more intelligent, and a plateau efficiency and an health level of a shelf can be improved.

Figure 7:
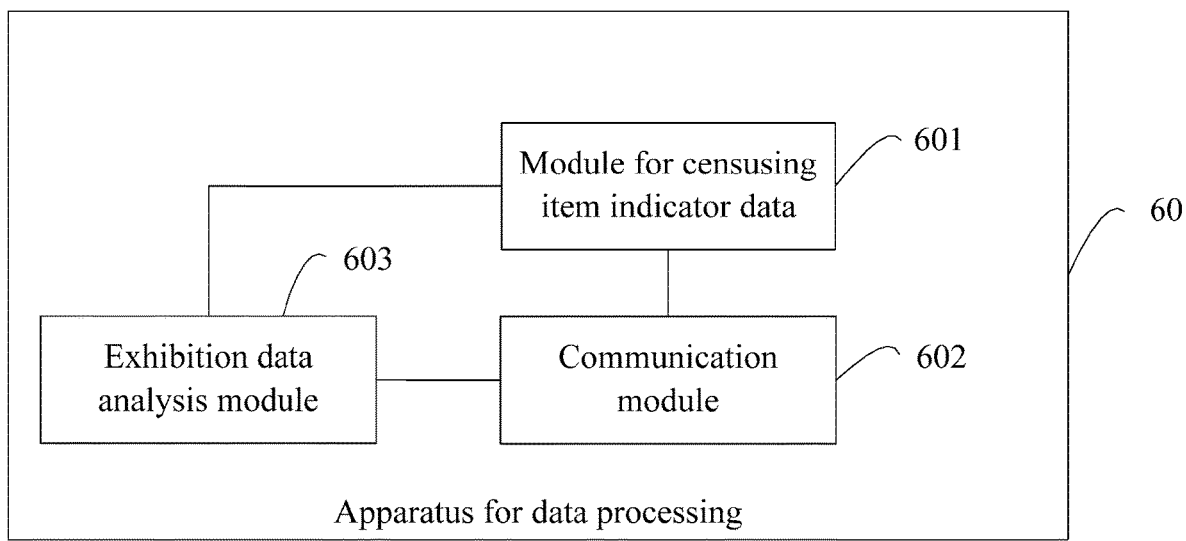
FIG. 7 is a schematic structural diagram of an apparatus for data processing according to one or more embodiments of the present application.

FIG. 7 is a schematic structural diagram of an apparatus for data processing according to one or more embodiments of the present application. On the basis of the above-mentioned embodiments, in this embodiment, the data pull request further includes a selected recommended algorithm identifier, the module for censusing item indicator data is further configured to:

determine, according to the real-time statistical indicator data of the corresponding item and a recommended algorithm corresponding to the recommended algorithm identifier, at least one group of items to be recommended: where a recommendation weight of an indicator of a respective dimension is set in the recommendation algorithm, and at least one dimension of indicator has a different recommendation weight among different recommendation algorithms.

In a possible implementation, the module for censusing item indicator data is further configured to:

acquire online sales data and/or offline sales data of all items periodically; and census, according to current sales data of the corresponding item, indicator data of the corresponding item in multiple dimensions to obtain the real-time statistical indicator data of the corresponding item.

In a possible implementation, as shown in FIG. 7, the apparatus for data processing 60 further includes: an exhibition data analysis module 603.

The communication module is further configured to: receive a drawing result.

The exhibition data analysis module 603 is configured to: determine exhibition position change information of a respective item in the drawing result according to the drawing result and corresponding original drawing data; and send the exhibition position change information of the respective item in the drawing result to an item exhibition terminal device.

In a possible implementation, the communication module is further configured to: receive a picture of an exhibition execution result.

The exhibition data analysis module 603 is further configured to: verify, according to the picture of the exhibition execution result and the drawing result, an exhibition execution result of the drawing result.

In a possible implementation, the exhibition data analysis module 603 is further configured to:

identify, according to the picture of the exhibition execution result, an item actually placed at each exhibition position; and compare the item actually placed at each exhibition position with an item of a corresponding exhibition position in the drawing result to determine whether a correct item exhibit at each exhibition position.

In a possible implementation, the communication module is further configured to:

send an exhibition position where the wrong item is exhibited to the item exhibition terminal device if a wrong item is exhibited at at least one exhibition position in the exhibition execution result of the drawing result.

In a possible implementation, the exhibition data analysis module 603 is further configured to:

acquire real-time statistical indicator data of a current exhibiting item periodically; and determine, according to the real-time statistical indicator data of the current exhibiting item, specified indicator data of a current manner of item exhibition.

In a possible implementation, the exhibition data analysis module 603 is further configured to:

determine, according to the specified indicator data of the current manner of item exhibition, whether the current manner of item exhibition satisfies a health exhibition condition; and issue notification information if it is determined the current manner of item exhibition does not satisfy the health exhibition condition.

The apparatus provided by the embodiment of the present application can be specifically configured to execute the method flow executed by the server in above-mentioned embodiments, and the specific functions will not be repeated here.

The server of the embodiment of the present application can receive the picture of the exhibition execution result: automatically verify the exhibition execution result of the drawing result according to the picture of the exhibition execution result and the drawing result, thereby realizing automatic supervision on the exhibition execution result and intelligent site patrol, automatically constraining the execution of the exhibition staff, and reducing workload of an on-site patrol staff and labor cost of on-site patrol: furthermore, when it is determined a wrong item is exhibited at at least one exhibition position after verifying, an exhibition position where the wrong item is exhibited is sent to the item exhibition terminal device, so as to make the item exhibition terminal device to display the exhibition position where the wrong item is exhibited, so that the exhibition staff can easily find the exhibition position where the wrong item is exhibited, and replace the item at this exhibition position, thereby realizing the correction of the item exhibition and improving the efficiency of the item exhibition.

The embodiment of the present application, by acquiring real-time statistical indicator data of a current exhibiting item periodically, performs health detection on the current manner of item exhibition according to the real-time statistical indicator data of the current exhibiting item, and if it is determined the current manner of item exhibition does not satisfy the health exhibition condition, issues the notification information, so as to make the planner to adjust the position of the item or take the item off the shelf, and realize intelligent adjustment to an item exhibition of a shelf.

Figure 8:
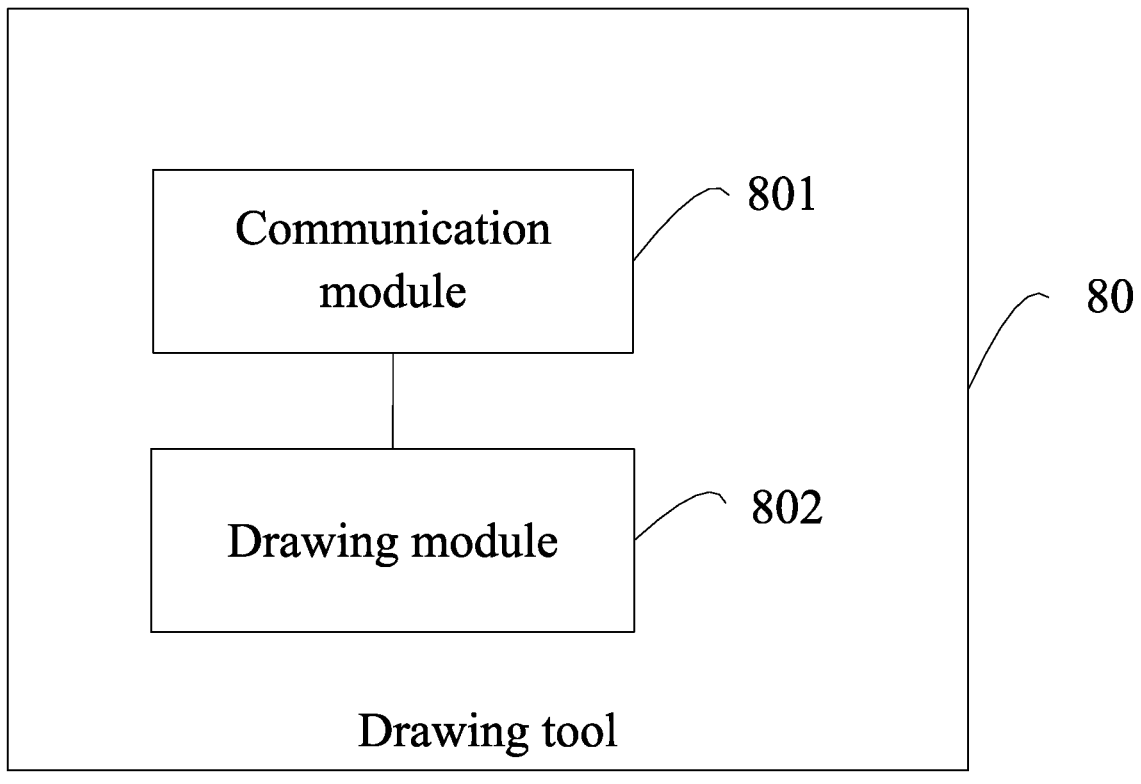
FIG. 8 is a schematic structural diagram of a drawing tool according to one or more embodiments of the present application.

FIG. 8 is a schematic structural diagram of a drawing tool according to one or more embodiments of the present application. The drawing tool provided by the embodiment of the present application can execute the processing flow provided by the embodiments of the method for data processing. As shown in FIG. 8, the drawing tool 80 includes a communication module 801 and a drawing module 802.

Specifically, the communication module 801 is configured to send a data pull request to a server before drawing a target item exhibition diagram, where the data pull request includes a drawing precondition.

The communication module 801 is further configured to receive indicator data of an item to be recommended sent by the server, where the item to be recommended is determined according to real-time statistical indicator data of a corresponding item of the drawing precondition.

The drawing module 802 is configured to automatically arrange the item to be recommended on a canvas, and display the indicator data of the item to be recommended.

In a possible implementation, the communication module 801 is further configured to send a drawing result to the server after completing the drawing.

The apparatus provided by the embodiment of the present application can be specifically configured to execute the method flow executed by the drawing tool in any embodiment of the method above-mentioned, and the specific functions will not be repeated here.

The embodiment of the present application, by acquiring real-time statistical indicator data of a corresponding item according to a drawing precondition in real time before drawing, determining an item to be recommended based on the real-time statistical indicator data of the corresponding item, and automatically recommending the item to be recommended to a drawing tool, so as to make the drawing tool to automatically arrange the item to be recommended on a canvas, and display the indicator data of the item to be recommended, which can reflect actual sales situation of an item in the market to the drawing tool, provide a data basis for a planner, and play a key guiding role for the planner performing a planning for an exhibition of an item, so that the item exhibition is more intelligent, and a plateau efficiency and an health level of a shelf can be improved.

Figure 9:
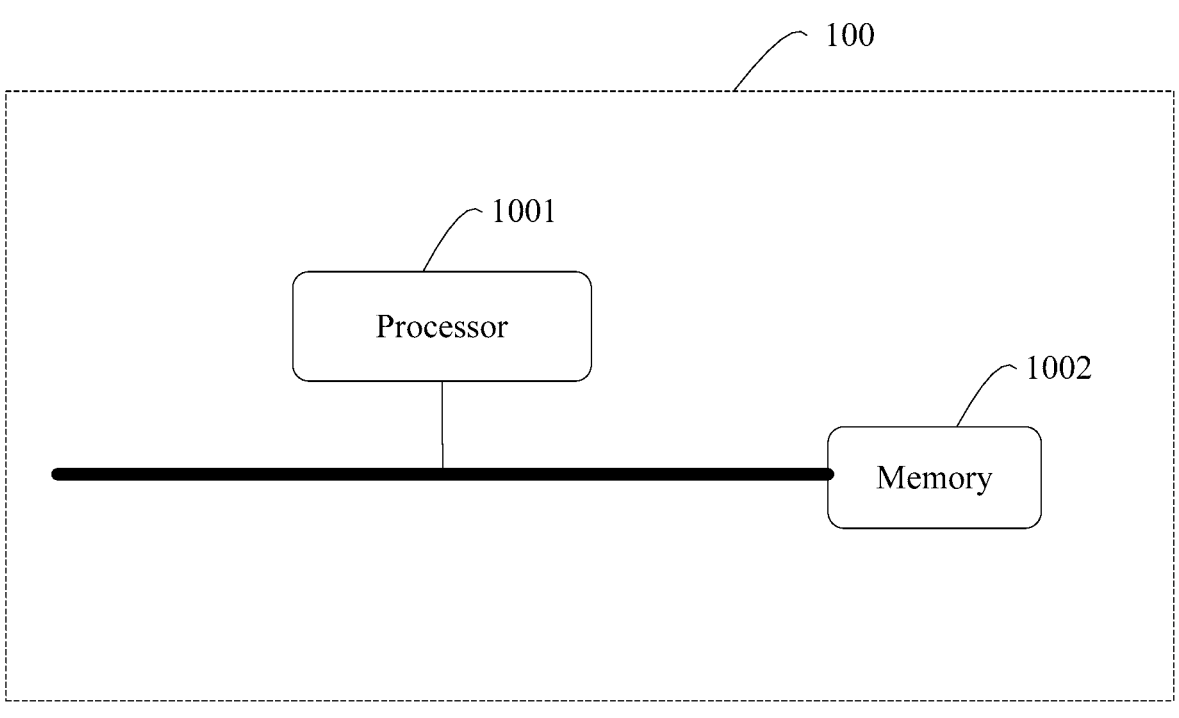
FIG. 9 is a schematic structural diagram of a device for data processing according to one or more embodiments of the present application.

FIG. 9 is a schematic structural diagram of a device for data processing according to one or more embodiments of the present application. As shown in FIG. 9, the device for data processing 100 includes a processor 1001, a memory 1002, and a computer program stored on the memory 1002 and executable on the processor 1001.

When the processor 1001 runs the computer program, the method flow executed by the server in any above-mentioned embodiment of the method is implemented.

The embodiment of the present application, by acquiring real-time statistical indicator data of a corresponding item according to a drawing precondition in real time before drawing, determining an item to be recommended based on the real-time statistical indicator data of the corresponding item, and automatically recommending the item to be recommended to a drawing tool, so as to make the drawing tool to automatically arrange the item to be recommended on a canvas, and display the indicator data of the item to be recommended, which can reflect actual sales situation of an item in the market to the drawing tool, provide a data basis for a planner, and play a key guiding role for the planner performing a planning for an exhibition of an item, so that the item exhibition is more intelligent, and a plateau efficiency and an health level of a shelf can be improved.

Figure 10:
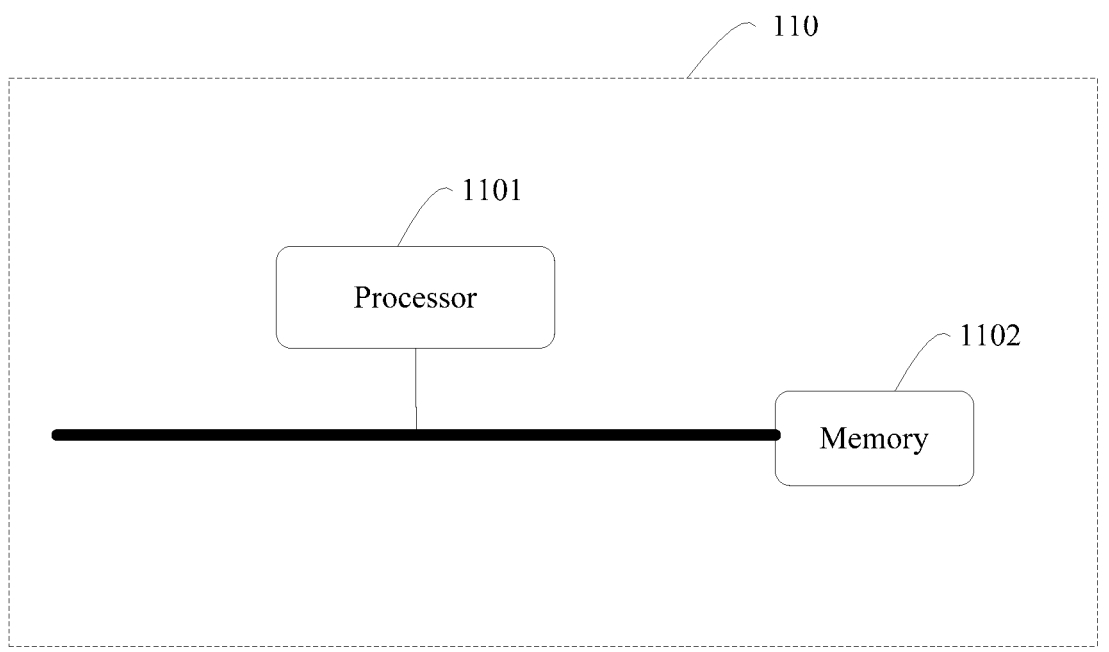
FIG. 10 is a schematic structural diagram of a drawing tool according to one or more embodiments of the present application.

FIG. 10 is a schematic structural diagram of a drawing tool according to one or more embodiments of the present application. As shown in FIG. 10, the drawing tool 110 includes: a processor 1101, a memory 1102, and a computer program stored on the memory 1102 and executable on the processor 1101.

When the processor 1101 runs the computer program, the method flow executed by the drawing tool in any above-mentioned embodiment of the method is implemented.

The embodiment of the present application, by acquiring real-time statistical indicator data of a corresponding item according to a drawing precondition in real time before drawing, determining an item to be recommended based on the real-time statistical indicator data of the corresponding item, and automatically recommending the item to be recommended to a drawing tool, so as to make the drawing tool to automatically arrange the item to be recommended on a canvas, and display the indicator data of the item to be recommended, which can reflect actual sales situation of an item in the market to the drawing tool, provide a data basis for a planner, and play a key guiding role for the planner performing a planning for an exhibition of an item, so that the item exhibition is more intelligent, and a plateau efficiency and an health level of a shelf can be improved.

The embodiment of the present application also provides a computer readable storage medium, where the computer readable medium has a computer program stored therein, when the computer program is executed by a processor, the method flow executed by the server in any above-mentioned embodiment of the method is implemented.

The embodiment of the present application also provides a computer readable storage medium, where the computer readable medium has a computer program stored therein, when the computer program is executed by a processor, the method flow executed by the drawing tool in any above-mentioned embodiment of the method is implemented.

The embodiment of the present application also provides a computer program, including a program code, when the program code is executed by a computer, the program code executes the method flow executed by the server in any above-mentioned embodiment of the method.

The embodiment of the present application also provides a computer program, including a program code, when the program code is executed by a computer, the program code executes the method flow executed by the drawing tool in any above-mentioned embodiment of the method.

Those skilled in the art can clearly understand that, for the convenience and brevity of the description, only taking the division of the above respective functional modules as an example for illustration. In an actual application, the above functions can be assigned to different functional modules for completion according to needs, that is the internal structure of an apparatus is divided into different functional modules to complete all or part of the functions described above. For the specific working process of the apparatus described above, reference may be made to the corresponding process in the foregoing embodiments of the method, and details will not be repeated here.

Other embodiments of the present application will readily occur to those skilled in the art upon consideration of the specification, and practice of the invention disclosed herein. The present application is intended to cover any variation, use or adaptive change of the present application, these variation, use or adaptive change follow the general principles of the present application and include common knowledge or conventional technical means in the technical field not disclosed in the present application. The specification and embodiments are to be regarded as exemplary only, the true scope and spirit of the present application will be indicated by the following claims.

It should be understood that the present application is not limited to the precise structures described above and illustrated in the accompanying drawings, and various modifications and changes may be made without departing from the scope thereof. The scope of the present application is limited only by the appended claims.

The invention claimed is:

1. A method for data processing, applied to a server, comprising:

acquiring real-time statistical indicator data of a corresponding item of a drawing precondition in response to a data pull request of a drawing tool, wherein the data pull request comprises the drawing precondition;

determining, according to the real-time statistical indicator data of the corresponding item, an item to be recommended; and pushing indicator data of the item to be recommended to the drawing tool;

wherein the method further comprises:

receiving a drawing result;

determining, according to the drawing result and corresponding original drawing data, exhibition position change information of a respective item in the drawing result; and sending the exhibition position change information of the respective item in the drawing result to an item exhibition terminal device;

after the sending the exhibition position change information of the respective item to the item exhibition terminal device, the method further comprises:

receiving a picture of an exhibition execution result; and verifying, according to the picture of the exhibition execution result and the drawing result, an exhibition execution result of the drawing result, to enable the drawing tool to arrange the item to be recommended on a canvas according to the indicator data of the item to be recommended;

wherein the data pull request further comprises a selected recommended algorithm identifier, the determining, according to the real-time statistical indicator data of the corresponding item, the item to be recommended comprises:

determining, according to the real-time statistical indicator data of the corresponding item and a recommended algorithm corresponding to the recommended algorithm identifier, at least one group of items to be recommended;

wherein a recommendation weight of an indicator of a respective dimension is set in the recommendation algorithm, and at least one dimension of indicator has a different recommendation weight among different recommendation algorithms.

2. The method according to claim 1, before the acquiring the real-time statistical indicator data of the corresponding item of the drawing precondition, further comprising:

acquiring at least one of online sales data and offline sales data of all items periodically;

the acquiring the real-time statistical indicator data of the corresponding item of the drawing precondition comprises:

censusing, according to current sales data of the corresponding item, indicator data of the corresponding item in multiple dimensions to obtain the real-time statistical indicator data of the corresponding item.

3. The method according to claim 1, before the acquiring the real-time statistical indicator data of the corresponding item of the drawing precondition, further comprising:

acquiring at least one of online sales data and offline sales data of all items periodically;

the acquiring the real-time statistical indicator data of the corresponding item of the drawing precondition comprises:

censusing, according to current sales data of the corresponding item, indicator data of the corresponding item in multiple dimensions to obtain the real-time statistical indicator data of the corresponding item.

4. The method according to claim 1, wherein the verifying, according to the picture of the exhibition execution result and the drawing result, the exhibition execution result of the drawing result comprises:

identifying, according to the picture of the exhibition execution result, an item actually placed at each exhibition position; and comparing the item actually placed at each exhibition position with an item of a corresponding exhibition position in the drawing result to determine whether a correct item is exhibited at each exhibition position.

5. The method according to claim 4, after the verifying, according to the picture of the exhibition execution result and the drawing result, the exhibition execution result of the drawing result, further comprising:

if a wrong item is exhibited at at least one exhibition position in the exhibition execution result of the drawing result, sending an exhibition position where the wrong item is exhibited to the item exhibition terminal device.

6. The method according to claim 1, after the verifying, according to the picture of the exhibition execution result and the drawing result, the exhibition execution result of the drawing result, further comprising:

if a wrong item is exhibited at at least one exhibition position in the exhibition execution result of the drawing result, sending an exhibition position where the wrong item is exhibited to the item exhibition terminal device.

7. The method according to claim 1, further comprising:

acquiring real-time statistical indicator data of a current exhibiting item periodically; and determining, according to the real-time statistical indicator data of the current exhibiting item, specified indicator data of a current manner of item exhibition.

8. The method according to claim 7, after the determining, according to the real-time statistical indicator data of the current exhibiting item, the specified indicator data of the current manner of item exhibition, further comprising:

determining, according to the specified indicator data of the current manner of item exhibition, whether the current manner of item exhibition satisfies a health exhibition condition; and if it is determined the current manner of item exhibition does not satisfy the health exhibition condition, issuing notification information.

9. A non-transitory computer readable storage medium, wherein the computer readable medium has a computer program stored therein, when the computer program is executed by a processor, the method according to claim 1 is implemented.

10. A method for data processing, applied to a drawing tool for drawing an item exhibition diagram, comprising:

sending a data pull request to a server before drawing a target item exhibition diagram, wherein the data pull request comprises a drawing precondition;

receiving indicator data of an item to be recommended sent by the server, wherein the item to be recommended is determined according to real-time statistical indicator data of a corresponding item of the drawing precondition; and arranging the item to be recommended on a canvas, and displaying the indicator data of the item to be recommended;

the method further comprises:

sending a drawing result to the server after completing the drawing, to enable the server to:

determine, according to the drawing result and corresponding original drawing data, exhibition position change information of a respective item in the drawing result;

send the exhibition position change information of the respective item in the drawing result to an item exhibition terminal device;

receive a picture of an exhibition execution result; and verify, according to the picture of the exhibition execution result and the drawing result, an exhibition execution result of the drawing result, to enable the drawing tool to arrange the item to be recommended on the canvas according to the indicator data of the item to be recommended;

wherein the data pull request further comprises a selected recommended algorithm identifier, the item to be recommended is from at least one group of items to be recommended determined according to the real-time statistical indicator data of the corresponding item and a recommended algorithm corresponding to the recommended algorithm identifier;

wherein a recommendation weight of an indicator of a respective dimension is set in the recommendation algorithm, and at least one dimension of indicator has a different recommendation weight among different recommendation algorithms.

11. A drawing tool, comprising:

a processor, a memory, and a computer program stored in the memory and executable on the processor;

wherein when the processor executes the computer program, the method according to claim 10 is implemented.

12. A non-transitory computer readable storage medium, wherein the computer readable medium has a computer program stored therein, when the computer program is executed by a processor, the method according to claim 10 is implemented.

13. A device for data processing, comprising:

a processor, a memory, and a computer program stored in the memory and executable on the processor;

wherein when the processor executes the computer program, the processor is configured to:

acquire real-time statistical indicator data of a corresponding item of a drawing precondition in response to a data pull request of a drawing tool, wherein the data pull request comprises the drawing precondition;

determine, according to the real-time statistical indicator data of the corresponding item, an item to be recommended; and push indicator data of the item to be recommended to the drawing tool;

wherein when the processor executes the computer program, the processor is further configured to:

receive a drawing result;

determine, according to the drawing result and corresponding original drawing data, exhibition position change information of a respective item in the drawing result;

send the exhibition position change information of the respective item in the drawing result to an item exhibition terminal device;

receive a picture of an exhibition execution result; and verify, according to the picture of the exhibition execution result and the drawing result, an exhibition execution result of the drawing result, to enable the drawing tool to arrange the item to be recommended on a canvas according to the indicator data of the item to be recommended;

wherein the data pull request further comprises a selected recommended algorithm identifier, and the processor is further configured to:

determine, according to the real-time statistical indicator data of the corresponding item and a recommended algorithm corresponding to the recommended algorithm identifier, at least one group of items to be recommended;

wherein a recommendation weight of an indicator of a respective dimension is set in the recommendation algorithm, and at least one dimension of indicator has a different recommendation weight among different recommendation algorithms.

14. The device according to claim 13, wherein the processor is further configured to:

acquire at least one of online sales data and offline sales data of all items periodically;

the processor is further configured to:

census, according to current sales data of the corresponding item, indicator data of the corresponding item in multiple dimensions to obtain the real-time statistical indicator data of the corresponding item.

15. The device according to claim 13, wherein the processor is further configured to:

acquire at least one of online sales data and offline sales data of all items periodically;

and the processor is further configured to:

census, according to current sales data of the corresponding item, indicator data of the corresponding item in multiple dimensions to obtain the real-time statistical indicator data of the corresponding item.

* * * * *